(12) United States Patent
Makaran

(10) Patent No.: US 7,091,685 B2
(45) Date of Patent: Aug. 15, 2006

(54) OVERLOAD PROTECTION FOR DC MOTORS

(75) Inventor: John E. Makaran, London (CA)

(73) Assignee: Siemens VDO Automotive Inc., Chatham (CA)

( * ) Notice: Subject to any disclaimer, the term of this patent is extended or adjusted under 35 U.S.C. 154(b) by 26 days.

(21) Appl. No.: 10/966,761

(22) Filed: Oct. 15, 2004

(65) Prior Publication Data
US 2005/0162114 A1 Jul. 28, 2005

Related U.S. Application Data

(60) Provisional application No. 60/538,346, filed on Jan. 22, 2004.

(51) Int. Cl.
*H02K 17/32* (2006.01)
(52) U.S. Cl. .............. 318/434; 318/254; 318/271; 318/279; 318/376
(58) Field of Classification Search ........ 318/434, 318/254, 271, 279, 431, 376, 459, 430, 439, 318/139; 700/2; 388/800, 842
See application file for complete search history.

(56) References Cited

U.S. PATENT DOCUMENTS 5,917,297 A * 6/1999 Gerster et al. ............ 318/366
6,696,804 B1 * 2/2004 Sutter et al. ............... 318/254
6,745,083 B1 * 6/2004 Eckardt et al. ............. 700/2

* cited by examiner

Primary Examiner—Karen Masih

(57) ABSTRACT

A closed-loop system 10 is provided for controlling a DC motor. The system includes a DC motor 12, a controller 18 associated with the motor and constructed and arranged to control operation of the motor, a voltage sensor 14 constructed and arranged to measure a voltage supplied to the motor, a speed sensor 16 associated with the motor and constructed and arranged to obtain a measured speed of the motor, and a conditioning circuit 21 constructed and arranged to receive a speed signal and condition the speed signal to provide to the controller, a nominal speed based on the voltage supplied to the motor, or nominal rate of acceleration or deceleration upon a change in the desired speed. The controller 18 is constructed and arranged to compare the measured speed with a certain speed, that is less than the nominal speed, at a voltage corresponding to a measured voltage, and if the measured speed is less than the certain speed, a fault condition is defined by the controller. The controller 18 is also constructed and arranged to compare the measured rate of change of speed with a desired rate of change of speed, that is more than the nominal rate of change of speed in the case of motor acceleration, or less than the nominal rate of change of speed in the case of deceleration, at a voltage corresponding to a measured voltage, and if the measured rate of change of speed differs significantly from the expected rate of change of speed, a fault condition is defined by the controller.

28 Claims, 5 Drawing Sheets

OVERLOAD PROTECTION FOR DC MOTORS

This application is based on U.S. Provisional Application No. 60/538,346 filed on Jan. 22, 2004 and claims the benefit thereof for priority purposes.

FIELD OF THE INVENTION

The invention relates to DC motors and, more particularly, to a process of protecting brush or brushless DC motors during overload conditions that may be the result of, but not limited to, seized bearings, snow packing conditions, and load obstructions without the use of current sensing.

BACKGROUND OF THE INVENTION

Brush and brushless DC motors have been used frequently in battery-supplied applications, such as automotive, electric vehicle, forklift, etc. Damage to the motor can be caused by continuing to energize the motor in the event of a locked rotor, or reduced speed conditions that can result from full or partial obstruction of the motor rotor. Under these conditions, damage to the motor or the control mechanism for the motor itself can be the result.

In the control of a DC motor, or a DC brushless motor using electronic control means, variable speed is typically achieved through the use of Pulse Width Modulation (PWM). The electronic controller typically receives a control signal (analog or digital) through a control lead to vary the duty cycle of the PWM voltage applied to the motor windings. As a result, the motor speed will vary in accordance with speed control signal. A typical motor speed vs. command signal input is shown in FIG. 1, where the control signal is an actual low frequency PWM signal where the desired motor speed is determined by the positive or negative duty cycle.

In addition, in a typical PWM driven motor, current, and or temperature of power stage components are also measured in order to determine if the power stage components should be shut down due to an overload condition to protect either the motor, or control electronics. The system voltage can also be measured in order to shut down the motor in the event of an overvoltage or undervoltage condition. For example, in one typical application, it is desired to operate the motor from +9 V to +16 V. Within this range of operational voltages, a separate motor speed vs. control signal duty cycle will be present at any discrete voltage value. This relationship is shown in FIG. 2.

In some DC motor systems, the motor speed is also measured to indicate whether or not the motor has experienced a locked rotor condition. In many motor control systems, current and/or temperature are used to determine whether of not the motor has experienced an overload condition. Due to the characteristics of the temperature/current measuring conditioning circuitry, however, damage may occur to the motor and/or control circuitry due to the potentially long time constants associated with conditioning circuits. As such, current protection schemes may not protect the motor or control electronics under all foreseeable overload conditions. In addition, the additional circuitry associated with current/temperature limiting circuitry may increase the overall system cost due to the additional components required, as well as the process steps required to ensure repeatable, reliable operation of these circuits across production lots, and all operational conditions.

Accordingly, there is a need to provide an overload protection scheme that monitors motor speed at a particular voltage in order to provide reliable protection for both motor and control electronics across the entire operational range of the motor.

SUMMARY OF THE INVENTION

An object of the invention is to fulfill the need referred to above, in accordance with the principles of the invention; this object is obtained by providing a closed-loop system for controlling a DC motor. The system includes a DC motor, a controller associated with the motor and constructed and arranged to control operation of the motor, a voltage sensor constructed and arranged to measure a voltage supplied to the motor, speed measurement structure associated with the motor and constructed and arranged to obtain the measured speed of the motor, and a conditioning circuit constructed and arranged to receive a speed signal and condition the speed signal to provide to the controller, a nominal speed based on the voltage supplied to the motor. The controller is constructed and arranged to compare the measured speed with an expected speed, that is less than the nominal speed, at a voltage corresponding to a measured voltage, and if the measured speed is less than the expected speed, a fault condition is defined by the controller.

In accordance with another aspect of the invention, a method is provided for detecting a fault condition of a closed-loop DC motor system. The system includes a DC motor, a controller associated with the motor and constructed and arranged to control operation of the motor, a voltage sensor constructed and arranged to measure a voltage supplied to the motor, speed measurement structure associated with the motor and constructed and arranged to obtain a measured speed of the motor, and a conditioning circuit constructed and arranged to receive a speed signal and condition the speed signal to provide to the controller, a nominal speed, based on the voltage supplied to the motor. The method obtains the expected, or desired speed of the motor, measures the voltage supplied to the motor at the desired speed, defines a lowest possible desired speed of the motor at the measured voltage, after a speed of the motor has reached a steady-state condition, measuring the steady-state motor speed, and defines a fault condition when the measured steady-state motor speed is less than the lowest possible desired speed.

In accordance with yet another aspect of the invention, a method of detecting a fault condition of a closed-loop DC motor system is provided. The system includes a DC motor, a controller associated with the motor and constructed and arranged to control operation of the motor, a voltage sensor constructed and arranged to measure a voltage supplied to the motor, speed measuring structure associated with the motor and constructed and arranged to obtain a measured speed of the motor, and a conditioning circuit constructed and arranged to receive a speed signal and condition the speed signal to provide to the controller, a nominal speed, based on the voltage supplied to the motor. The method obtains a desired rate of change of speed of the motor, measures the voltage supplied to the motor at the nominal speed, defines a limit of the desired speed of the motor at the measured voltage, and defines a fault condition when the measured rate of change of speed deviates a certain amount from the limit of the desired rate of change of speed.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE PRESENTLY PREFERRED EXEMPLARY EMBODIMENT

Figure 7:
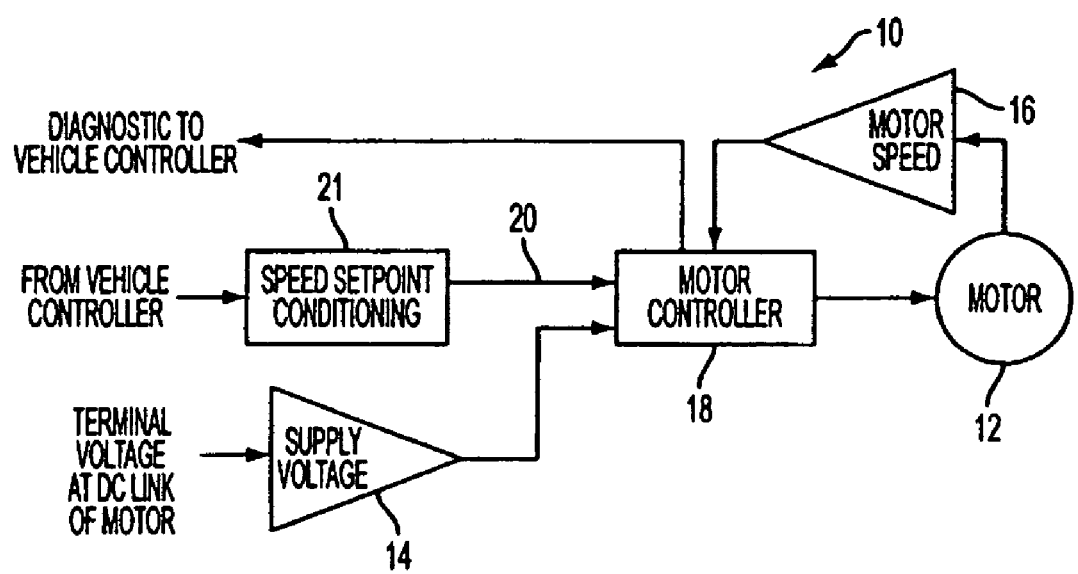
FIG. 7 shows a block diagram of an overload protection system provided in accordance with the principles of the invention.

With reference to FIG. 7, a closed-loop control system for a DC motor is shown schematically, generally indicated at 10, in accordance with the invention. The system 10 includes a DC motor 12, a voltage sensor 14 for determining a supply voltage of the motor, speed measuring structure, for example, a sensor 16, for measuring a speed of the motor 12, a conditioning circuit 21 and control electronics 18. The voltage sensor 14, for example, can include circuitry such as a resistor divider network fed to an analog-to-digital converter or could include a series of discrete values from a comparator chain. The speed sensor 16 can be, for example, circuitry for conditioning the back electro-magnetic force (EMF) induced in the motor windings, a Hall effect sensor, or a reluctance coil.

The control electronics or controller 18 can include a micro-controller, or analog control device. The speed setpoint conditioning circuit 21 is associated with the controller 18 and receives a signal from the vehicle controller (not shown) and conditions the signal to provide a nominal speed signal based on the voltage supplied to the motor. The controller 18 is constructed and arranged to (1) determine the desired motor speed as a percentage of the maximum speed from the control signal present on the control line 20 from the vehicle controller (2) calculate a PWM duty cycle limit based on the desired motor speed (3) obtain the measured the supply voltage (4) obtain the motor speed.

For steady state operation, the motor controller 18 is also constructed and arranged to compare the measured speed with the lowest possible desired motor speed at the voltage of concern (e.g., the measured voltage). This may be done using a look-up table or linear equation in the case of a microcontroller, or a reference voltage in the case of an analog circuit. If the actual motor speed is greater than a fixed percentage lower than the lowest possible desired motor speed, the motor controller 18 could perform several actions in order to prevent damage to the motor 12 or motor controller 18. For example, the motor controller 18 could shut down the motor 12 and alert the control head, and/or end user of the overload condition. It could also limit the power to the motor 12 in order to maintain operation but also to a prevent failure of the control electronics or controller 18.

Figure 1:
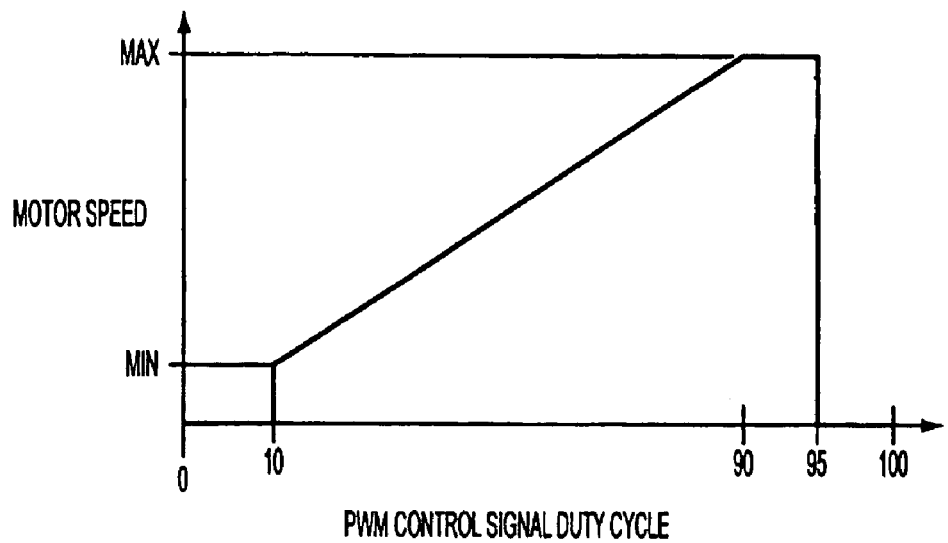
FIG. 1 shows a typical steady state motor speed vs. a command signal input at a fixed motor voltage.
Figure 2:
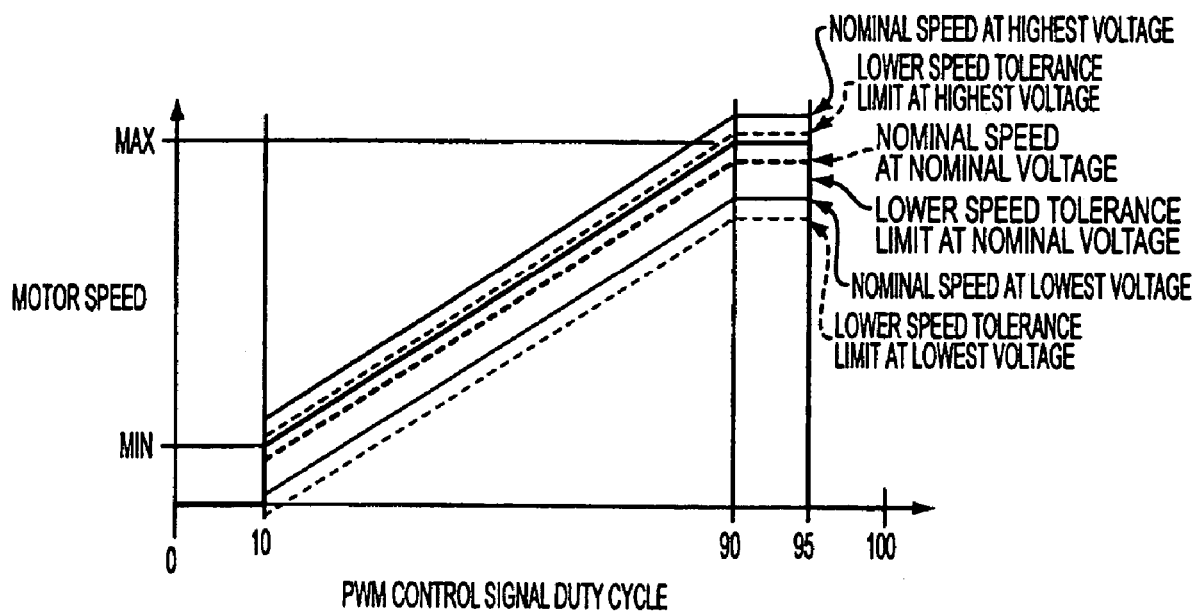
FIG. 2 shows typical steady state motor speed vs. command signal input at discrete values of motor voltages vs. a command signal input.
Figure 3:
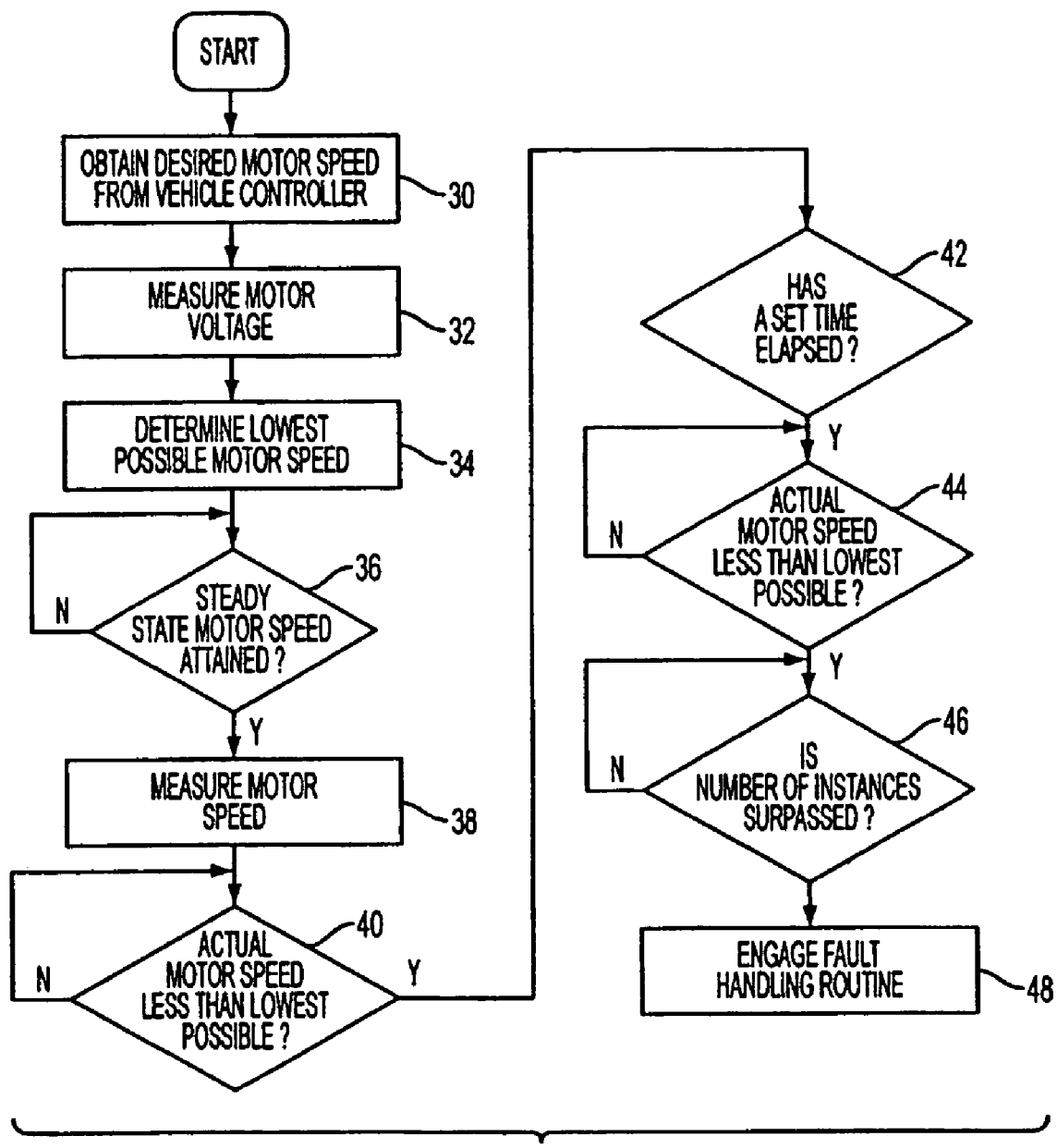
FIG. 3 is a flowchart outlining the overload protection algorithm of the invention for steady state motor operation.
Figure 4:
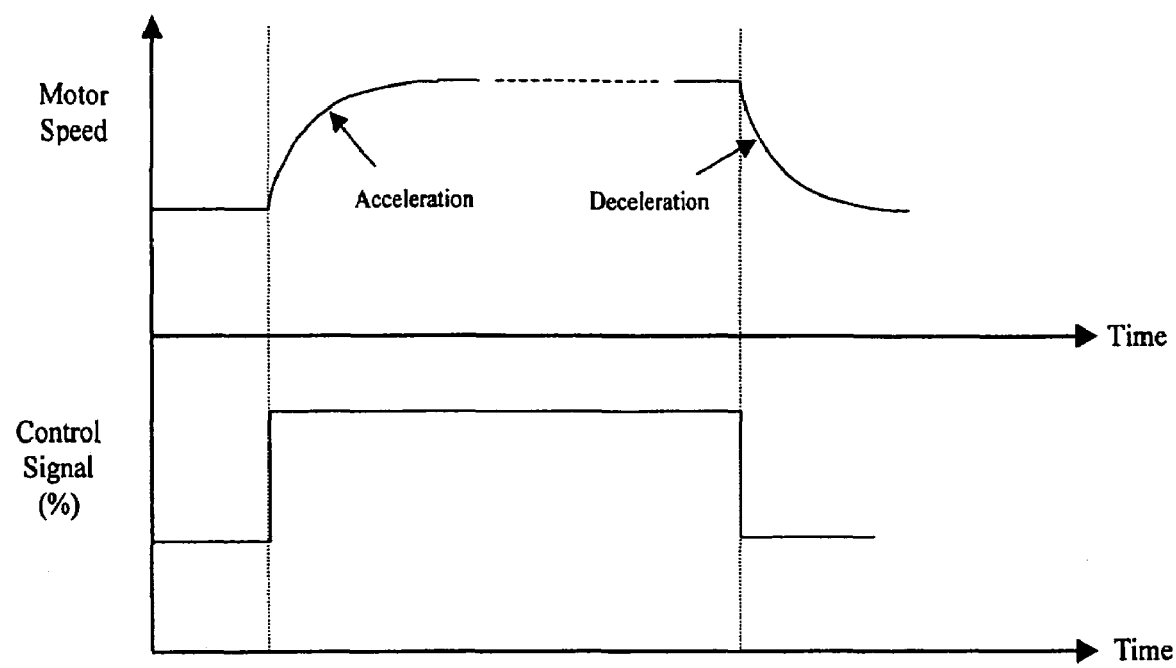
FIG. 4 shows a typical increase in motor speed and current versus time for an increase in the motor speed command, and also shows a typical decrease in motor speed and current versus time for a decrease in motor speed command.

An overload protection process for a DC motor in an automotive system is shown in FIG. 4 in accordance with an embodiment of the invention. In step 30, the motor controller 18 obtains the desired motor speed from the vehicle controller. In step 32, the voltage sensor 14 measures the motor supply voltage at the desired speed. In step 34, at the measured voltage, the lowest possible motor speed is determined. For each duty cycle, the motor will have a desired speed under nominal conditions. Thus, there will be a range of speeds for each duty cycle (as in FIG. 2). The lowest possible speed is the lowest possible desired speed and is obtained through experimentation and/or process data based on a particular duty cycle.

For transient motor speed conditions, where an increase, or decrease in the motor speed command has been experienced, there will be a condition when the motor should achieve a target steady state speed in a given period of time. If this speed has not been achieved, then this could be indicative of an overload condition. Thus, in step 36, it is determined if steady state motor speed is obtained, and if so, in step 38, the steady-state motor speed is measured via sensor 16. In step 40, it is determined if the actual, steady-state motor speed is less than the lowest possible motor speed and if so, it is determined if a set time has elapsed in step 42 (e.g., determine if the condition is occurring over a period of time). Once the set time has elapsed, it is determined in step 44 if the actual motor steady-state motor speed is less than the lowest possible motor speed, and if this occurs a certain number of times as determined in step 46, then the controller 18 can engage a fault routine in step 48.

In addition to protecting the motor and control electronics due to an overload condition, the above-mentioned algorithm could also be used to limit motor speed during sudden changes of motor voltage that may be present in vehicle.

Thus, the system 10 prevents extended overload conditions, and brief current surges during severe voltage changes in a DC motor. In one aspect of the invention voltage and speed of the motor based on a set point value are measured and used to i) either shut down the motor, ii) limit the power delivered to the motor, or iii) perform actions i) or ii) while engaging a fault handling routine that could include combinations of i) or ii) while delivering a fault code to the controlling device so that it may alert the operator or deal with the overload condition using its own internal fault handling routine.

Figure 6:
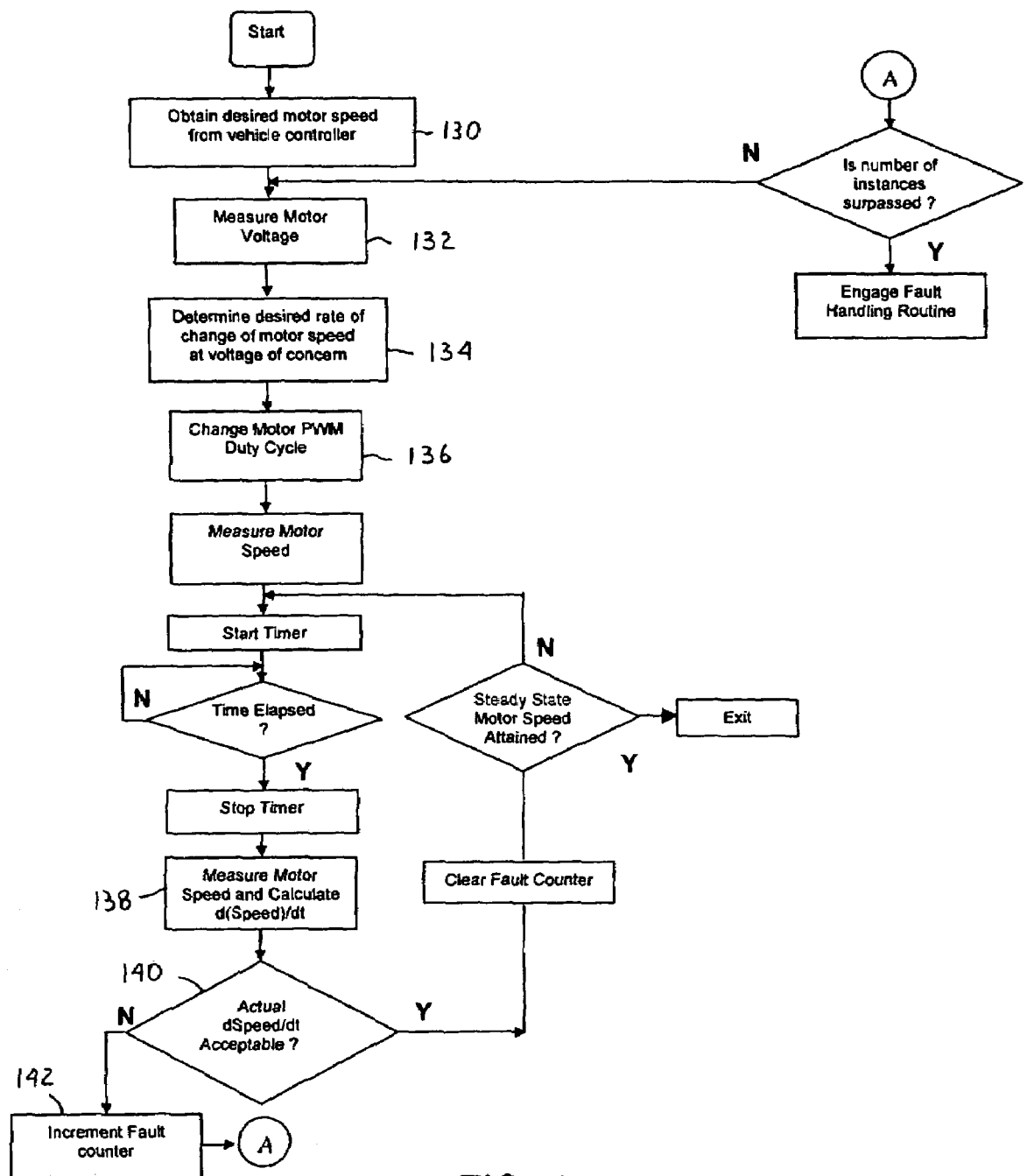
FIG. 6 is a flowchart outlining the overload protection algorithm of another embodiment of the invention for motor acceleration or deceleration behavior based on a change in the speed control signal.

Another embodiment of the invention is shown in FIG. 6 with regard to transient motor speed conditions. In step 130, the expected, or desired rate of change of speed is obtained. In step 132, the voltage supplied to the motor at a nominal speed is measured, and in step 134, a limit of the desired rate of change of motor speed at the measured voltage is determined. During acceleration or deceleration of the motor upon receipt of a speed change command (step 136), the rate of change of speed is obtained in step 138. In the case of a desired speed increase resulting in acceleration, the motor controller defines a fault condition (step 142) when the measured rate of change of speed, d(Speed)/dt, is equal to or greater than the lowest possible desired rate of change of speed (step 140). In the case of a desired speed decrease resulting in motor deceleration, the motor controller defines a fault condition when the measured rate of change of speed is less than the highest possible desired rate of change of speed.

FIG. 4 shows a typical increase in motor speed and current versus time for an increase in the motor speed command, and also shows a typical decrease in motor speed and current versus time for a decrease in motor speed command. This behavior is illustrated for one operational motor voltage.

Figure 5:
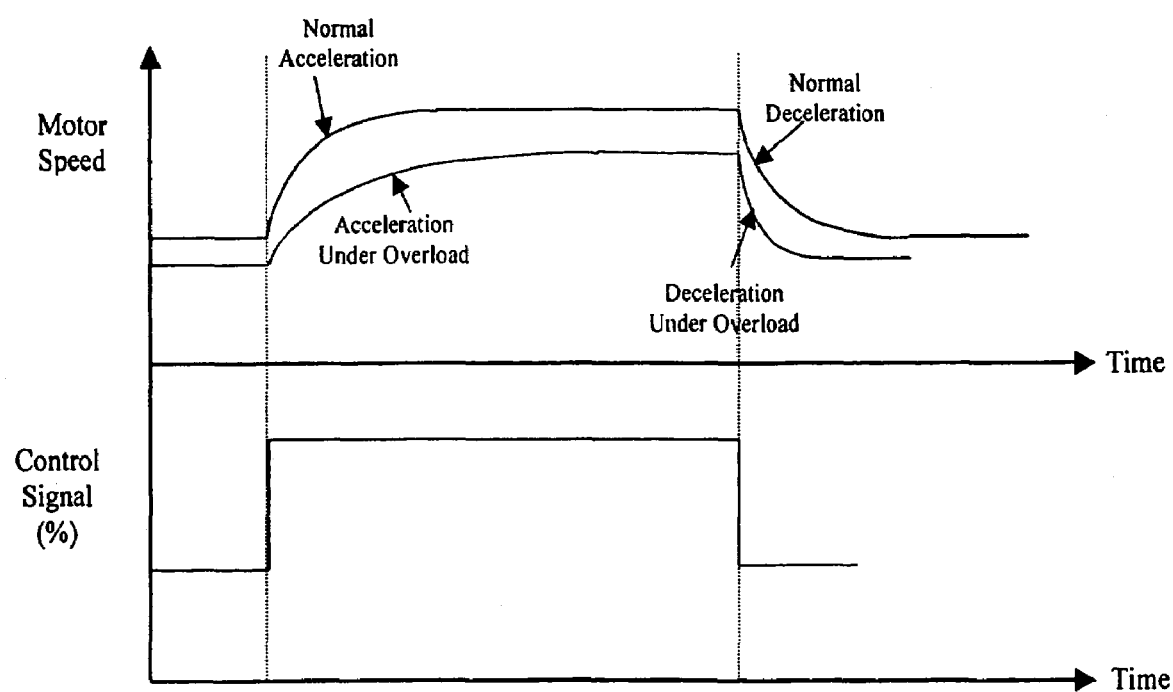
FIG. 5 shows a typical increase in motor speed and current versus time for an increase in the motor speed command for an overloaded motor, and also shows a typical decrease in motor speed and current versus time for a decrease in motor speed command

FIG. 5 shows a typical increase in motor speed and current versus time for an increase in the motor speed command for an overloaded motor, and also shows a typical decrease in motor speed and current versus time for a decrease in motor speed command. This behavior is illustrated for one operational motor voltage.

In any given motor production lot, there will be a tolerance in the steady state speed range, or in the rate of change of speed that will be experienced due to material and process factors. Regarding a motor that drives a fan, the nominal motor speed (with a fan load) can vary +/−10% under full load conditions. As such, any limits set in the protection system 10 must be subject to a worst-case tolerance stack-up of electromechanical as well as electronic components.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A closed-loop system for controlling a DC motor, the system comprising:
   a DC motor,
   a controller associated with the motor and constructed and arranged to control operation of the motor,
   a voltage sensor constructed and arranged to measure a voltage supplied to the motor,
   speed measuring structure associated with the motor and constructed and arranged to obtain a measured speed of the motor, and
   a conditioning circuit constructed and arranged to receive a speed signal and condition the speed signal to provide to the controller, a nominal speed based on the voltage supplied to the motor,
   whereby the controller is constructed and arranged to compare the measured speed with an expected speed, that is less than the nominal speed, at a voltage corresponding to a measured voltage, and if the measured speed is less than the expected speed, a fault condition is defined by the controller.

2. The system of claim 1, wherein when the fault condition is defined, the controller is constructed and arranged to one of i) shut down the motor, and ii) limit power delivered to the motor.

3. The system of claim 1, wherein when the fault condition is defined, the controller is constructed and arranged to engage a fault handling routine that delivers a fault code to a controlling device to address an overload condition of the motor.

4. The system of claim 1, wherein the controller is a micro-controller.

5. The system of claim 1, wherein the controller is an analog control device.

6. A closed-loop system for controlling a DC motor, the system comprising:
   a DC motor,
   means for controlling operation of the motor,
   means for measuring a voltage supplied to the motor,
   means for measuring a speed of the motor, and
   means for receiving a speed signal and for conditioning the speed signal to provide to the means for controlling, a nominal speed based on the voltage supplied to the motor,
   whereby the means for controlling is configured to compare the measured speed with a certain speed, that is less than the nominal speed, at a voltage corresponding to a measured voltage, and if the measured speed is less than the certain speed, a fault condition is defined by the means for controlling.

7. The system of claim 6, wherein when the fault condition is defined, the means for controlling is constructed and arranged to one of i) shut down the motor, and ii) limit power delivered to the motor.

8. The system of claim 6, wherein when the fault condition is defined, the means for controlling is constructed and arranged to engage a fault handling routine that delivers a fault code to a controlling device to address an overload condition of the motor.

9. The system of claim 6, wherein the means for controlling is a micro-controller.

10. The system of claim 6, wherein the means for controlling is an analog control device.

11. The system of claim 6, wherein the means for measuring speed is a speed sensor.

12. The system of claim 6, wherein the means for measuring voltage is a voltage sensor.

13. A method of detecting a fault condition of a closed-loop DC motor system, the system including a DC motor, a controller associated with the motor and constructed and arranged to control operation of the motor, a voltage sensor constructed and arranged to measure a voltage supplied to the motor, speed sensor associated with the motor and constructed and arranged to obtain a measured speed of the motor, and a conditioning circuit constructed and arranged to receive a speed signal and condition the speed signal to provide to the controller, a nominal speed, based on the voltage supplied to the motor, the method including the step of:
   obtaining the desired speed of the motor,
   measuring the voltage supplied to the motor at the desired speed,
   defining a lowest possible desired speed of the motor at the measured voltage, after a speed of the motor has reached a steady-state condition,
   measuring the steady-state motorspeed, and
   defining a fault condition when the measured steady-state motor speed is less than the lowest possible desired speed.

14. The method of claim 13, further including shutting down the motor after the fault condition is defined.

15. The method of claim 13, further including limiting power delivered to the motor after the fault condition is defined.

16. The method of claim 13, wherein the motor is part of a vehicle system and the desired speed is obtained from a vehicle controller.

17. A closed-loop system for controlling a DC motor, the system comprising:
- a DC motor,
- a controller associated with the motor and constructed and arranged to control operation of the motor,
- a voltage sensor constructed and arranged to measure a voltage supplied to the motor,
- speed measuring structure associated with the motor and constructed and arranged to obtain a measured speed of the motor, and
- a conditioning circuit constructed and arranged to receive a speed signal and condition the speed signal to provide to the controller, a nominal speed at a measured voltage,
- whereby the controller is constructed and arranged to 1) determine a measured rate of change of speed based on the measured speed, 2) determine a desired rate of change of speed at the measured voltage, 3) compare the measured rate of change of speed with a limit of the desired rate of change of speed at the measured voltage, and 4) define a fault condition when the measured rate of change of speed deviates a certain amount from the limit of the desired rate of change of speed.

18. The system of claim 17, wherein during an acceleration condition, the controller is constructed and arranged to define the fault condition when the measured rate of change of speed is greater than a lowest possible desired rate of change of speed.

19. The system of claim 17, wherein during a de-acceleration condition, the controller is constructed and arranged to define the fault condition when the measured rate of change of speed is less than a highest possible desired rate of change of speed.

20. The system of claim 17, wherein when the fault condition is defined, the controller is constructed and arranged to one of i) shut down the motor, and ii) limit power delivered to the motor.

21. The system of claim 17, wherein when the fault condition is defined, the controller is constructed and arranged to engage a fault handling routine that delivers a fault code to a controlling device to address an overload condition of the motor.

22. The system of claim 17, wherein the controller is a micro-controller.

23. The system of claim 17, wherein the controller is an analog control device.

24. A method of detecting a fault condition of a closed-loop DC motor system, the system including a DC motor, a controller associated with the motor and constructed and arranged to control operation of the motor, a voltage sensor constructed and arranged to measure a voltage supplied to the motor, speed sensor associated with the motor and constructed and arranged to obtain a measured speed of the motor, and a conditioning circuit constructed and arranged to receive a speed signal and condition the speed signal to provide to the controller, a nominal speed, based on the voltage supplied to the motor, the method including the step of:
- obtaining a desired rate of change of speed of the motor,
- measuring the voltage supplied to the motor at the nominal speed,
- defining a limit of the desired speed of the motor at the measured voltage, and
- defining a fault condition when the measured rate of change of speed deviates a certain amount from the limit of the desired rate of change of speed.

25. The method of claim 24, wherein during an acceleration condition, the fault condition is defined when the measured rate of change of speed is greater than a lowest possible desired rate of change of speed.

26. The method of claim 24, wherein during a de-acceleration condition, the fault condition is determined when the measured rate of change of speed is less than a highest possible desired rate of change of speed.

27. The method of claim 24, further including shutting down the motor after the fault condition is defined.

28. The method of claim 24, further including limiting power delivered to the motor after the fault condition is defined.

* * * * *